Figure 4:
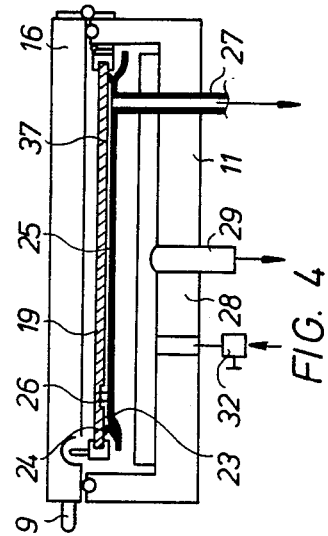

United States Patent [19]

Nelen

[11] Patent Number: 4,711,570

[45] Date of Patent: Dec. 8, 1987

[54] VACUUM CONTACT EXPOSURE APPARATUS

[75] Inventor: Petrus R. Nelen, Essen, Belgium

[73] Assignee: AGFA-Gevaert N.V., Mortsel, Belgium

[21] Appl. No.: 940,067

[22] Filed: Dec. 10, 1986

[30] Foreign Application Priority Data

Dec. 17, 1985 [EP] European Pat. Off. ......... 85202091.6

[51] Int. Cl.$^4$ ............................................. G03B 27/20
[52] U.S. Cl. ...................................................... 355/91
[58] Field of Search ..................................... 355/91-94, 355/87, 76

[56] References Cited

U.S. PATENT DOCUMENTS 3,455,634  7/1969  Guffon ................................... 355/91
3,604,800  9/1971  Jordan et al. .......................... 355/91
3,995,955 12/1976  Töpfer ................................... 355/91
4,054,383 10/1977  Lin et al. ............................... 355/91
4,484,813 11/1984  Maher et al. .......................... 355/93
4,551,016 11/1985  Maher et al. .......................... 355/91

Primary Examiner—Richard A. Wintercorn
Attorney, Agent, or Firm—William J. Daniel

[57] ABSTRACT

A vacuum contact exposure device for exposing a light-sensitive sheet to another sheet, which comprises a housing with a hinged top cover, a contact exposure space formed between a glass plate and a flexible blanket inside said housing, and means for creating an underpressure in the housing, wherein in succession the housing and the contact exposure space are evacuated, the exposure space is closed, the atmospheric pressure is restored in the housing while the exposure space remains evacuated, and the lid is opened and the exposure carried out.

9 Claims, 7 Drawing Figures

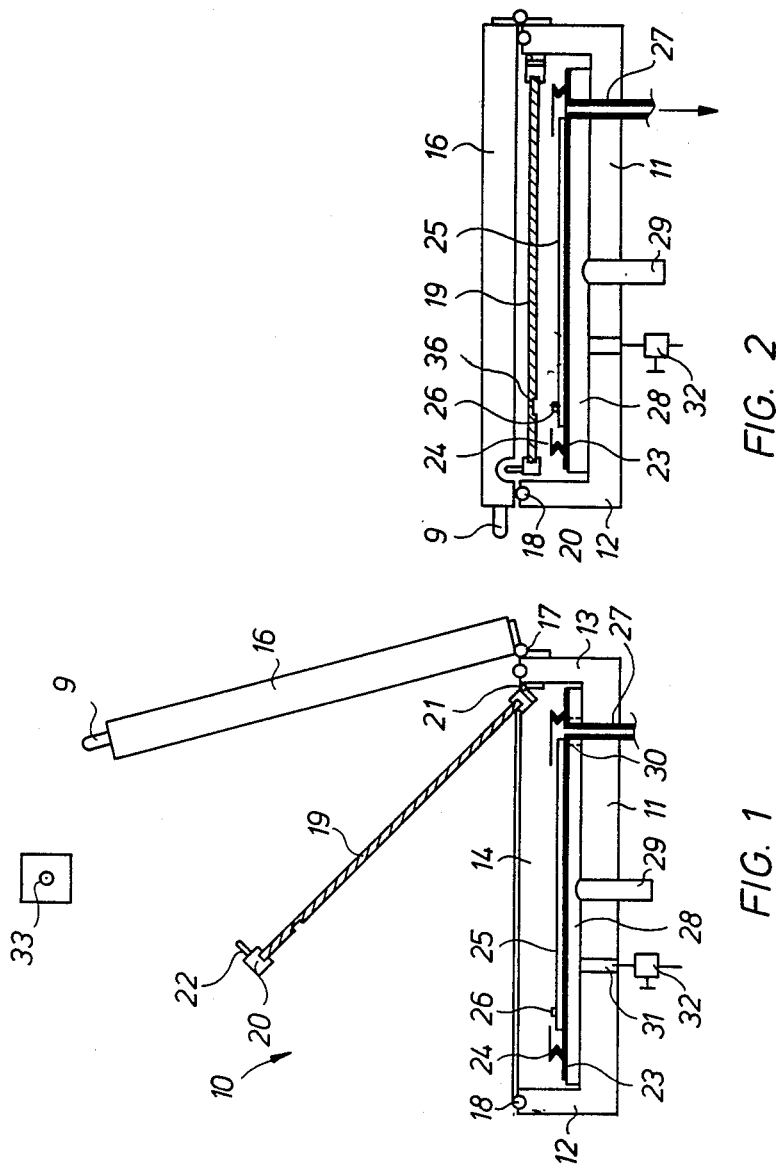

VACUUM CONTACT EXPOSURE APPARATUS

Description

The present invention relates to a vacuum contact exposure apparatus for exposing a light-sensitive photographic sheet to at least one other sheet.

Vacuum contact exposure apparatus for the graphic arts are well known and they generally comprise a base upon which there is mounted normally in a horizontal position a blanket frame which includes a flexible impervious blanket having a peripheral bead. A glass frame is positioned above the blanket frame and adapted for snug registry with its bead for defining a contact exposure space between the glass frame and blanket. Hinges interconnect the glass frame with the blanket frame so that the glass frame may be pivoted or otherwise elevated with respect to the blanket frame in order to permit loading upon the blanket of a light-sensitive sheet and thereover a transport original to be reproduced. A vacuum source is provided having a conduit for providing vacuum communication to the contact exposure space. After a predetermined period the flexible blanket of the blanket frame is drawn tightly and snugly up against the glass of the glass frame after which a top light source that is mounted spaced from and above the glass plate is energised for exposing the sensitized sheet or plate.

An inverse arrangement of the glass and blanket frames and the light source is also possible, the light source emitting light upwardly from beneath the glass frame.

If the blanket is allowed to be drawn towards the glass plate on initial aspiration of air from the contact exposure space, the movement of the blanket tends to trap air in such space. This is probably due to the way in which the vacuum is propagated through such space, although the surface structure of the photographic material itself may to some extent be responsible.

The entrapment of air pockets causes unsharpness of the produced photographic images. When screened images are exposed, the air pockets are reproduced in the form of so-called vacuum patterns. In the case that a negative light-sensitive film is exposed to such screened original, the vacuum patterns are in the form of zones of anomalously higher density and the screen dots lack sharpness in such zones; moreover the space between the dots may show some fog. The gravity of this problem depends on the size of the image parts to be reproduced. Text blocks are not very critical in this respect. However, screened images are more critical, and the adverse consequences of vacuum patterns tend to be worse as the screen rulings number becomes higher.

Quite apart from the air pocketing problem, the time required for achieving good contact between the light-sensitive sheet and the original(s) is some times inconveniently long if an "original" comprising several sheets is present. In the case of screen work in particular, a combination of two or more screened original sheets is not at all unusual. Practice shows that once the required underpressure in the contact exposure space has been obtained, it may take tens of seconds before a satisfactory contact between the light-sensitive sheet and the original sheet(s) is obtained.

Attempts have been made to achieve evacuation of the contact exposure space in a shorter time by using a strong vacuum pump, but it has been found that a stronger pump usually increases the tendency for air islands to be trapped and the time required to eliminate them makes the pump time as long as when using a weaker pump, or practically so.

In U.S. Pat. No. 4,484,813 there is described an improved vacuum printer in which the flexible blanket is withdrawn or held away from the glass plate by a suitable exterior underpressure until such time as substantially all of the air has been withdrawn from the contact exposure space between the glass plate and the blanket. Then the pressure on the exterior side of the blanket is allowed to increase to atmospheric. In this way the tendency for air pockets to become trapped is reduced or avoided.

In the operation of the printer described in U.S. Pat. No. 4,484,813 the glass plate is subjected to bending forces during the period the blanket is held away from the glass plate and the contact exposure space is being evacuated, because the outside of the plate is exposed to atmospheric pressure. These forces would be very high indeed if the apparatus were to be made suitable for making large format prints. For example, for an evacuation degree of e.g. 80%, a force of more than 6 tons would be exerted on a glass plate measuring $76.2 \times 101.6$ cm ($30 \times 40$ inches). The printer design is in consequence unsuitable for large print formats. In order to resist such bending forces the glass plate would need to have a thickness of more than 5 centimeters. This would make the handling of the glass frame difficult and dangerous on account of its weight. Moreover glass of that thickness would entail a significant light transmission loss.

It is the object of the present invention to provide an improved vacuum contact exposure apparatus which permits the use of glass plates of conventional thicknesses, also for large size sheet formats, and yet enables a good contact between the sheets in the contact exposure space to be quickly established.

In accordance with the present invention, a vacuum contact exposure apparatus for contact-exposing a light-sensitive photographic sheet to at least one other sheet, such apparatus comprising a flexible blanket with a peripheral sealing means, a transparent plate for positioning against said sealing means to form with said blanket a contact exposure space enclosing said sheets, and means for evacuating air from such exposure space to promote intimate contact between said sheets and between the sheets and said plate preparatory to exposure through said plate, is characterised in that the apparatus incorporates a housing for air-tightly enclosing the plate-blanket assembly prior to such exposure step, aspirating means associated with said housing and by operation of which the pressure on the exterior of said plate and blanket can be reduced so that it is sub-atmospheric during said evacuation of air from said exposure space, and means by operation of which air can be admitted into said housing while said contact exposure space remains evacuated; said housing being openable to allow contact exposure then to be effected through said transparent plate.

As already indicated, although exposure of a light-sensitive sheet in a contact exposure apparatus sometimes occurs in contact with an "original" comprising a single sheet, e.g. a sheet bearing screened image to be reproduced, the original may also comprise a sandwich of two or more sheets. The latter situation occurs especially in the reprographic arts, wherein a light-sensitive sheet is exposed to the combination of a photographic reproduction, e.g. a black-and-white color selection of a colored original, and one or a plurality of masks. A particular case wherein a light-sensitive sheet is usually exposed to a combination of to or more sheets, is in the PRINTON DESC system (i.e. Dry Etching System by Computer), marketed by Agfa-Gevaert N.V., Mortsel-Belgium. This system is a computer-controlled working station for photographic colour retouching, and comprises an integrated working table, contact exposure cabinet, computer, and densitometer. It permits to run the two final stages of the pre-press, namely the production of "clean" films and the colour correction retouching, in particular the author's corrections which are subjective or even random corrections that change the subjective content of the reproduction, in one step as a combined operation. A contact exposure chamber that operates rapidly and provides a perfect contact between the sheets, is an indispensable tool in suchlike system.

An apparatus according to the invention, can be operated so that although evacuation of air from the contact exposure space occurs while the blanket is out of pressure contact with the transparent plate, this plate is not subjected to bending forces by exposure to external atmospheric pressure. Preferably the pressure in the housing, acting on the exterior of the transparent plate, is reduced so that it is at all times substantially equal to the pressure on the interior side of the plate during the time that the contact exposure space is being evacuated with the blanket out of pressure contact with the plate.

In preferred apparatus according to the invention, the housing when closed defined a unitary space totally enveloping the transparent plate and blanket, at least the transparent plate or the blanket is mounted for displacement relative to the other of them, and there is means for bringing about such displacement under remote control, while the said housing is closed and under reduced internal pressure, to bring such components from an open relationship in which the contact exposure space is in communication with the said enveloping space in the said housing, to a closed relationship in which said contact exposure space is sealed by said sealing means. The adoption of these constructional features makes it particularly easy to achieve the above-mentioned balanced pressure reduction on opposite sides of the transparent plate.

By way of example, the blanket or the transparent plate can be mounted for movements towards and away from sealing relationship with the transparent plate or the blanket as the case may be, under remote control as aforesaid. In one form of apparatus according to the invention, the blanket is bodily displaceable towards and away from the transparent plate by the action of a lifting and lowering mechanism. In another form of apparatus according to the invention, the blanket or the transparent plate is associated with a pad of foamed plastics having a closed cell structure which is capable of effecting the necessary displacements of the blanket or plate by expansion and contraction of the pad in consequence of reduction and rise of pressure in the housing.

The invention will be described hereinafter by way of example with reference to the accompanying drawings wherein:

FIG. 1 is a diagrammatic representation of one embodiment of a device according to the invention, in the opened position, FIG. 2 illustrates the same device in the closed position, the evacuation of the housing being started.

Figure 7:
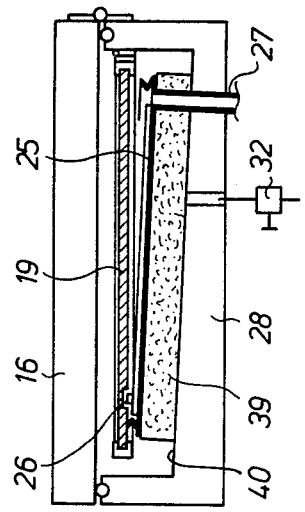
Figure 3:
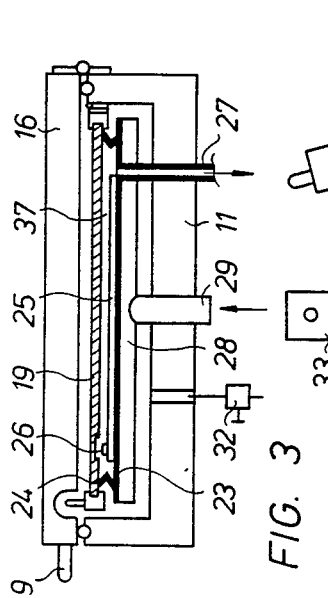
Figure 5:
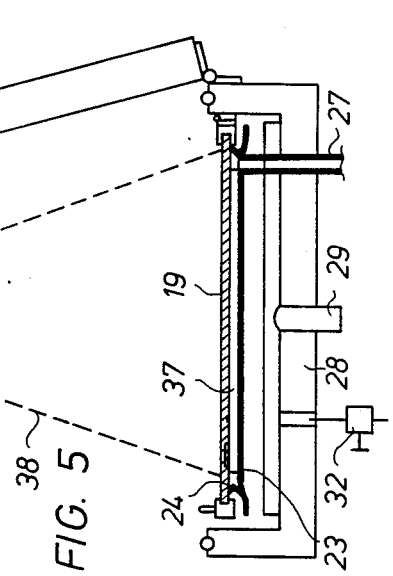
Figure 6:
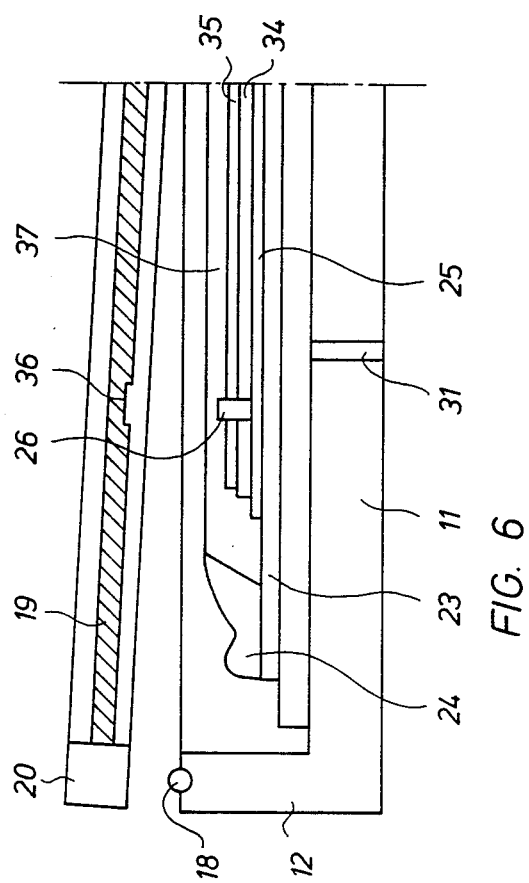

FIG. 3 illustrates the closing of the contact exposure space by means of a displaceable lifting plate, FIG. 4 illustrates the re-aeration of the housing of the device, while the vacuum in the contact exposure space is maintained, FIG. 5 illustrates the exposure of the photographic material, FIG. 6 illustrates an enlarged section of a partly opened device, and FIG. 7 illustrates an alternative embodiment of FIG. 3, for the closing of the contact exposure space.

Referring to FIG. 1, the vacuum contact exposure device comprises a housing 10 formed by a rectangular bottom wall 11 and four upstanding side walls, such as the side walls 12, 13 and 14 shown, and a lid 16 that is hinged to the housing at 17 and that in the closed position air-tightly fits on the housing through a peripheral sealing ring 18. A glass plate 19 is fitted in a frame 20 that is hinged at position 21 to the rear wall 13 of the housing and that may be provided with a handle 22 for the lifting and the lowering of the plate. The closed position of the glass plate 19 is illustrated in FIG. 2 in which it may be seen that the space between the glass plate and the closed lid of the device is in communication with the space below the plate through an opening between the front side of the frame 20 and the wall 12 of the housing.

The device comprises further a flexible air-impervious blanket 23 which has a peripheral sealing bead 24. The blanket may in a known way be constructed of rubber or neoprene or a laminate of rubber and canvas. The sealing bead 24 is usually a compressible Z or V-like profile of soft rubber of the like. The blanket has near one corner a vacuum connection in the form of a conduit 27 that can air-tightly axially slide through a corresponding bore in the bottom wall 11 of the device. The conduit 27 is connected directly to a vacuum pump, not illustrated. Onto the blanket there is placed a base plate 25 which has a row of linearly spaced register pins 26. In the operative position of the device, the register pins 26 fit in a corresponding groove 36 that is milled in the lower surface of the glass plate 19, see FIG. 4. The device comprises further a lifting plate 28 that is mounted on a central spindle 29 that is air-tightly and vertically displaceable through a corresponding bore in the bottom wall 11 of the device. The plate 28 has a bore 30 through which the conduit 27 freely passes.

Further, the device has an aeration opening 31 in the bottom wall that is controlled by a valve 32.

Finally, there is provided a high-intensity point-like light source 33 above the exposure frame of the device for carrying out the exposure of the light-sensitive material.

The operation of the device is described hereinafter with reference to FIGS. 1 to 5 which illustrate different phases of the operation, and also with reference to FIG. 7 which is an enlarged representation of a section of the device.

Referring to FIG. 1, the device is shown in the opened position that permits a light-sensitive sheet 34 and a negative film 35 or the like, see also FIG. 6, to be positioned on the base plate 25 with the pre-cut register holes of the sheets fitting over the corresponding pins 26 of the base plate.

The glass plate 19 is lowered and the lid 16 is closed. As appears from FIG. 2, the glass plate, when lowered, does not contact the sealing bead 24 on the blanket 23, so that the contact exposure space is at this stage still open.

After the underpressure in the housing has reached a value that is close to the final underpressure in the contact exposure space, for instance an evacuation up to 75%, the lifting plate 28 is raised by actuation of the spindle 29, see FIG. 3. The force with which the lifting plate 28 is urged towards glass plate 19 can be small since the only effect which is aimed at is to bring the blanket to an elevation in which the peripheral bead 24 engages the glass plate 19, thereby sealing the space between the blanket and the glass plate, which constitutes in fact the contact exposure space 37, see FIGS. 3 and 4.

A next step comprises the opening of the value 32, and the subsequent lowering of the lifting plate 28, see FIG. 4. The reduced pressure in the housing rapidly rises to the normal atmospheric pressure, and this also in the space at the upper surface of the glass plate 19. The blanket 23 becomes deformed as illustrated, by the pressure difference between its inner and outer side, and as a consequence both sheets in the contact exposure space 37 are urged in snug contact with each other. The evacuation of air through the conduit 27 still continues in order to compensate for occasional small air leakages, e.g. at the sealing bead 24.

In a fifth phase, see FIG. 5, the lid 16 of the device is opened. This operation does not offer any problem since the interior of the apparatus is again at atmospheric pressure. The light-head 33 is activated, either by switching on the light source thereof, or by opening the diaphragm of the light-head in the case of a continuously burning light-source, and the exposure of the light-sensitive material is carried out by a beam of light as represented by the cone 38 in FIG. 5.

The exposure being terminated, the vacuum pump is arrested whereby the atmospheric pressure is rapidly restored in the contact exposure space. The frame 20 with the glass plate 19 can then be swung upwardly, as illustrated in FIG. 1, and the exposed light-sensitive sheet be removed and subjected to a suitable processing for developing the exposed image.

A second embodiment of the invention is illustrated in FIG. 7. The general configuration of the device is like the device disclosed in FIGS. 1 to 6, except for the means for displacing the blanket towards the glass plate after the contact exposure space and also the interior of the housing have at least partially been evacuated, which means is in this embodiment in the form of a foam rubber pad 39 with closed cell structure which is interposed between the blanket 23 and the upper surface 40 of the bottom wall 11 of the device. The surface 40 has a slanting position, the lowest point being most remote from the margin of the base plate 25 that bears the register pins 26. The pad of foam may be freely disposed between the corresponding surfaces of the base plate and the bottom wall, but said pad may also be adhered to one, but not to both, of said surfaces.

The operation of the device is as follows. The device being loaded and the evacuation started as described hereinbefore with reference to FIGS. 1 and 2, the increasing evacuation of the interior of the housing causes a progressive swelling of the pad of foam that tends to keep the pressure inside of its closed cells in balance with the outside pressure. The increasing thickness of the pad of foam causes first the portion of the peripheral bead 24 of the blanket 23 that is adjacent to the row of pins 26, to enter in contact with the glass plate 25. Continued increase in size of the pad of foam makes the contact of the peripheral sealing bead to extend along the lateral sides until finally the side that is opposite to the side where the initial contact started, enters also in engagement with the glass plate.

It should be noted that the engagement of the plate 19 by the sealing bead of the blanket occurs very gently, so that the mentioned contact constitutes a neglectable biasing of the glass plate.

While the evacuation through the conduit 27 continues, the valve 32 is opened so that atmospheric pressure is restored within the housing. The foam pad instantly resumes its original shape, and the atmospheric pressure acts on the blanket so that the sheets in the contact exposure space are firmly urged onto each other. After the exposure has occurred, the atmospheric pressure in the contact exposure space may be restored by arresting the evacuation, and by putting the conduit 27 in communication with the atmospheric pressure.

It has been shown that the described progressive contact between the sheets in the contact exposure space, up from the margin with the register pins towards the opposite margin, has a very favourable effect on the tension-free positioning of the sheets on the register pins, so that a better registry of the images of successively produced sheets was obtained, than with a device wherein the contact between the sheets in the contact exposure space occurred instantly over the complete surface of the sheets, and "pulling" of the sheets on the register pins sometimes occurred.

The following characteristics illustrate a device as described hereinbefore with reference to FIG. 7.

Max. format of sheet to be exposed: 762×1016 mm
Size of glass plate: 819×1073 mm
Thickness of glass plate: 8 mm
Thickness of pad at atmospheric pressure: 35 mm
Maximum thickness of pad at 80% evacuation: 45 mm
Material of pad: foam rubber with closed cell structure, marketed under the tradename ARMAFLEX (trade name used by Armstrong Cork Company, Pennsylvania, USA)
Density of foam: 300 g/dm3
Slope of bottom surface: 0.5 angular degrees
Lid 16 of the device: 1163×913 mm made from honey-comb aluminium structure with a thickness of 5 cm, and a weight of 13 kgs. Bending measured at centre: 2 mm for an evacuating of the device of 80%.

It will be understood that in practice the control of the complete evacuation and exposure cycle will preferably occur automatically. This is particular the case if the device is used in a system such as PRINTON DESC described hereinbefore, that is completely computer controlled. The actuation of the lid 16 and the glass frame 20 preferably occur in such case by motor means in the form of air cylinders, reciprocating link and/or chain mechanisms, etc.

The base wall of the device need not necessarily have a slanting surface such as illustrated in FIG. 7, but instead a foam structure with a wedge-like profile may be used.

The blanket must not necessarily have the configuration and the structure as described hereinbefore, but the blanket may also be constituted by a flexible foil of metal, such as a copper foil with a thickness of 0.5 mm, the sealing bead being formed in such case by a separate elastic bead that is adhered to the peripheral margin of the foil.

The following example illustrates the improved operation of the device according to the present invention. The device as illustrated in FIG. 7 was used for establishing the contact between a screened original and a light-sensitive sheet measuring 760×1016 mm. As the screened original there was used a 50% dot size screen on a polyester base with a thickness of 0.1 mm. As the light-sensitive sheet there was used a sheet with a medium coloured layer, in the present case the greenish looking light-sensitive emulsion layer of a previously uniformly exposed, but non-developed so-called daylight exposure film for use in the dry-etching method for the production of colour-corrected selection negatives. In the present case, the film was a direct positive Printon DLD 510p-film on a polyester base with a thickness of 0.1 mm, marketed by Agfa-Gevaert N.V., Mortsel, Belgium. The dotted side of the sheet 35 was in contact with the sheet 34. The progression of the evacuation of the air from between the sheets could be followed by the naked eye, in looking through the glass plate under roomlight conditions.

It could be seen that the intensity of the green colour gradually changed, but that isolated areas or "islands" with dimensions varying from one to several centimeters were left in the surface of the sheet that apparently were in delay of evacuation with respect to the remaining sheet surface. As the evacuation, and time, proceeded, the intensity and the size of these islands altered so that finally a practically uniform appearance of the sandwich of both sheets was obtained.

It was found that a visually satisfactory contact between the sheets was obtained after 25 seconds in the device according to the present invention, and after only 120 seconds if the operation was repeated in a prior art apparatus. For the present example, this prior art apparatus was the vacuum section of the exposure cabinet of the PRINTON DESC system described already.

The differences in operation were also demonstrated by using for the sheet 34 an unexposed light-sensitive film of the type as mentioned hereinabove and for the sheet 35 the described 50% screen film, and by carrying out by means of the light source 33 successive exposures of a series of films, each after a longer evacuation time, and this in the two devices. The exposed films were then developed and carefully examined for sharpness of dot reproduction, and for vacuum patterns. The results of these examinations confirmed the conclusions of the visual examination of the evacuation and contact proceedings.

I claim:

1. A vacuum contact exposure apparatus for contact-exposing a light-sensitive photographic sheet to at least one other sheet, such apparatus comprising a flexible blanket with a peripheral sealing means, a transparent plate for positioning against said sealing means to form with said blanket a contact exposure space enclosing said sheets, and means for evacuating air from such exposure space to promote intimate contact between said sheets and between the sheets and said plate preparatory to exposure through said plate, characterised in that the apparatus incorporates a housing for air-tightly enclosing the plate-blanket assembly prior to such exposure step, aspirating means associated with said housing and by operation of which the pressure on the exterior of said plate and blanket can be reduced so that it is at sub-atmospheric during said evacuation of air from said exposure space, and means by operation of which air can be admitted into said housing while said contact exposure space remains evacuated; said housing being openable to allow contact exposure then to be effected through said transparent plate.

2. Apparatus according to claim 1, wherein the housing when closed defines a unitary space totally enveloping the transparent plate and blanket, at least the transparent plate or the blanket is mounted for displacement relative to the other of them, and there is means for bringing about such displacement under remote control, while the said housing is closed and under reduced internal pressure, to bring such components from an open relationship in which the contact exposure space is in communication with the said enveloping space in the said housing, to a closed relationship in which said contact exposure space is sealed by said sealing means.

3. A vacuum contact exposure apparatus according to claim 2, wherein said means is formed by a displaceable lifting plate that is provided at the rearside of the blanket.

4. A vacuum contact exposure apparatus according to claim 2, wherein said displaceable means is formed by a pad of foam plastic with closed cell structure that is provided at the rearside of the blanket, the thickness of the pad being such that at atmospheric pressure the blanket takes a position that is remote from the blanket, and that at reduced pressure the pad expands to an extent such that the blanket is urged towards the glass plate.

5. A vacuum contact exposure apparatus according to claim 4, wherein the free surface of the pad takes at atmospheric pressure a slanting position with respect to the glass plate.

6. A vacuum contact exposure apparatus according to claim 5, wherein the pad is supported at its lower side on a slanting surface.

7. A vacuum contact exposure apparatus according to claim 6, wherein the blanket is provided with a plate with register pins and the pad takes its most close position to the blanket at the place of said register pins.

8. A vacuum contact exposure apparatus according to claim 1, wherein said means for admitting air into said housing while said contact exposure space remains evacuated, is formed by a bore and a corresponding valve at the lower part of the housing.

9. A vacuum contact exposure apparatus according to claim 1, which is provided with a lid that is mounted over the glass plate for opening and closing movements relative to the glass plate, said lid fitting in the closed position air-tightly on the housing, and said lid being made from a light-weight material with honey-comb core structure.

* * * * *